Oct. 17, 1933.  W. T. CLARK  1,931,020
GLARE SHIELD
Filed May 21, 1931
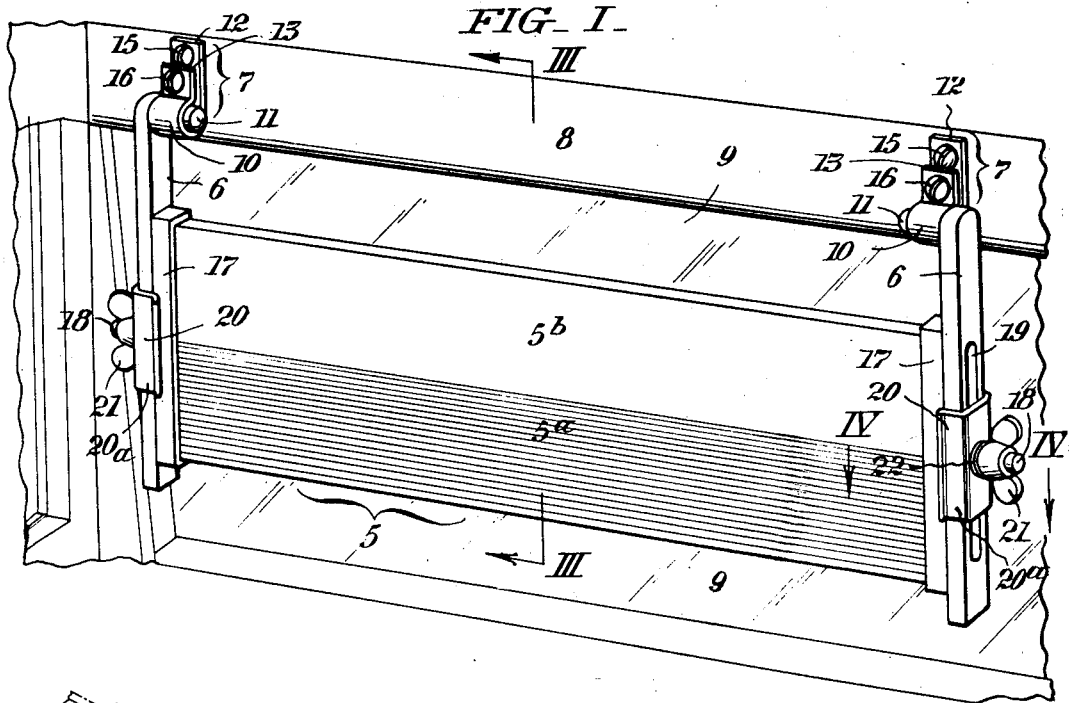
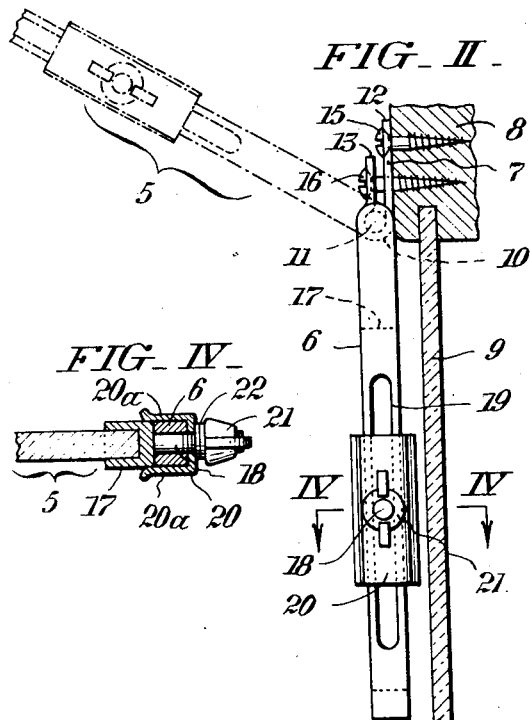
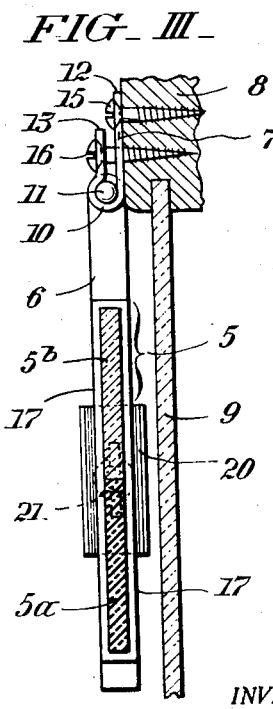
INVENTOR:
William T. Clark,
BY *Frally o Paul*
ATTORNEYS.

Patented Oct. 17, 1933

1,931,020

UNITED STATES PATENT OFFICE 1,931,020

GLARE SHIELD

William T. Clark, Philadelphia, Pa.

Application May 21, 1931. Serial No. 538,934

3 Claims. (Cl. 296—97)

This invention relates to glare shield means useful in connection with automobiles and the like.

The purpose of my invention is to afford motorists protection against the glare of light of different intensities without obstruction of vision to such an extent as to render driving difficult. In other words, my invention is directed toward the provision of a sight protective device with a transparent shield which embodies a portion or section of suitable ray filtering color or actinic resistivity suitable for the modification of direct sunlight glare incident to driving in daylight, and a portion or section of another ray filtering color or of different actinic resistivity to counteract the glare of the headlights of approaching vehicles at night; and with means for supporting the shield with capacity for being moved out of the way when not needed, as well as with capacity for adjustment so that the different portions of the shield may be selectively placed in the line of the driver's vision.

One way in which the foregoing desiderata may be conveniently realized in practice will be manifest from the detailed description which follows in coordination with the attached drawing, wherein Fig. I is a fragmentary perspective view of the frontal interior portion of an automobile body showing my improved glare protective means.

Fig. II is an edge view of the device.

Fig. III is a fragmentary vertical section taken as indicated by the arrows III—III in Fig. I;

Fig. IV is a detail section taken as indicated by the arrows IV—IV in Figs. I and II.

As herein delineated, the glare protective device of my invention comprises a transparent horizontal shield plate 5 which is supported at opposite ends by arms 6 having pivotal or hinge connection with brackets 7 which are secured to the transverse or frontal head member 8 of the automobile body above the usual wind-shield indicated at 9. By virtue of this arrangement, the shield 5 is obviously swingable from the normal position illustrated in dotted lines in Fig. II out of the way, to the vertical active position parallel to the wind-shield 9 as illustrated in full lines. Each bracket 7 is fashioned to the configuration shown from a narrow strip of sheet metal with formation of a split bearing 10 to receive the pivot stud 11 of the corresponding supporting arm 6, the bending of the metal being so ordered as to determine a long end 12 and an overlapping short end 13. The brackets 7 are fastened to the head rail 8 by pairs of screws 15 and 16 whereof the latter pass through both ends 12, 13 of said brackets for capacity to serve as regulatory instrumentalities in varying the frictional restraint imposed upon the pivot studs 11 of the associated arms 6. In this way the shield plate 5 can be yieldingly maintained in different positions of angular adjustment without the aid of special means for the purpose. The use of the individual studs 11 with the arms 6, instead of a continuous pivot rod, is advantageous in that it facilitates attachment of the brackets 7 to the frontal head member 8 of the automobile body and in that it, at the same time, obviates the necessity for strict alignment as between the brackets 7. The studs 11 are purposely directed inwards or toward each other as illustrated so that the brackets 7 fall within the confines of the shield 5. This is an important feature since it favors greater compactness of the device as a whole.

The shield plate 5, it will be noted, consists of a pair of longitudinally arranged juxta-positioned narrow strip portions or sections 5a, 5b of glass which are alike as regards length, width and thickness but of different ray filtering colors or of different actinic resistivity. For example, the strip 5a may be of a shade of green suitable for the modification of direct sun light glare incident to driving during the day, and the strip 5b of chartreuse or dark amber which will counteract the glare of headlights of approaching vehicles at night while permitting the driver to see the red stop lights of vehicles ahead. As shown in Fig. I, the portions or sections 5a and 5b of the shield plate 5 are engaged in recessed bars 17 and secured in said bars with a suitable cementitious compound. Projecting laterally from the bars 17 at their centers are studs 18 which pass through longitudinal slots 19 in the arms 6; and engaged over the protruding ends of the studs are clips 20. These clips 20 it will be noted, are of channel cross-section with flanges 20a adapted to bear against the sides of the arm 6 and to lap the end bars 17 of the shield plate 5. Associated with the studs 18 are thumb nuts 21 and lock washers 22. Through the provisions just described it will be apparent that the shield plate 5 may be adjusted along the length of the arms 6 to suit the height of the driver as well as swung about the axis of the studs 18 so that either of the two differently colored portions or areas 5a, 5b of the shield plate 5 may be placed in the line of the driver's vision. The vertical adjustment may be affected by loosening the thumb nuts 21 and simply sliding the plate 5 up or down along the arms 6. To swing the plate 5 about the pivot studs 18 it is necessary to back-off the thumb nuts 21 sufficiently to withdraw the clips 20 from the end bars 17 of the shield plate 5 before said plate can be rotated on its pivot studs 18. Normally, the clips 20 operate to maintain the side bars 17 of the shield plate 5 in coincidence with the side arms 6 by which said plate is supported.

While I have specifically mentioned glass as a material from which the shield plate 5 is made, it is obvious that any other transparent material such as celluloid or the like may be employed in lieu thereof.

Having thus described my invention, I claim:

1. In glare shield supporting means for automobiles and the like the combination of a pair of slotted arms embodying opposingly-directed studs for pivotal suspension in bearing brackets, each said bracket comprising a unitary split-bearing with means capable of imposing frictional restraint on the engaged stud, associated channel-section bars jointly affording support for a transparent glare shield, said bars having lateral studs at their centers passing through the slotted arms aforesaid, apertured clips coacting with the lateral studs adapted to bear against the sides of the slotted arms and to lap the bars aforesaid, and means whereby the bars may be adjustably secured along the slotted arms or swung about the lateral studs to position the glare shield.

2. In glare shield supporting means for automobiles and the like the combination of a pair of slotted arms embodying opposingly-directed terminal studs for pivotal suspension in aligned bearing brackets, each said bracket consisting of a narrower strip contoured to provide a split-bearing with long and short overlapping portions, and means capable of imposing frictional restraint on the engaging terminal stud, associated channel-section bars affording support for a transparent glare shield, said bars having lateral studs at their centers passing through the slotted arms aforesaid, apertured channel-section clips co-acting with the lateral studs adapted to bear against the sides of the slotted arms and to lap the bars aforesaid, and wing nuts engaging screwed ends of the lateral studs whereby the glare shield may be adjustably secured or swung about said studs.

3. A glare shield supporting means for automobiles and the like comprising a slotted arm embodying a laterally-directed stud for pivotal suspension in a unitary split-bearing capable of imposing frictional restraint on the engaged stud, an associated channel-section bar affording support for a transparent glare shield, said bar having a lateral stud at the center passing through the slotted arm aforesaid, an apertured channel section clip coacting with the lateral stud adapted to bear against the sides of the slotted arm and to lap the bar aforesaid, and means whereby both the bar and clip may be adjustably secured along the slotted arm or swung about the lateral stud to position the glare shield.

WILLIAM T. CLARK.